J. J. BYRON.
DUMP WAGON.
APPLICATION FILED APR. 9, 1913.
1,087,723.
Patented Feb. 17, 1914.
2 SHEETS—SHEET 1.
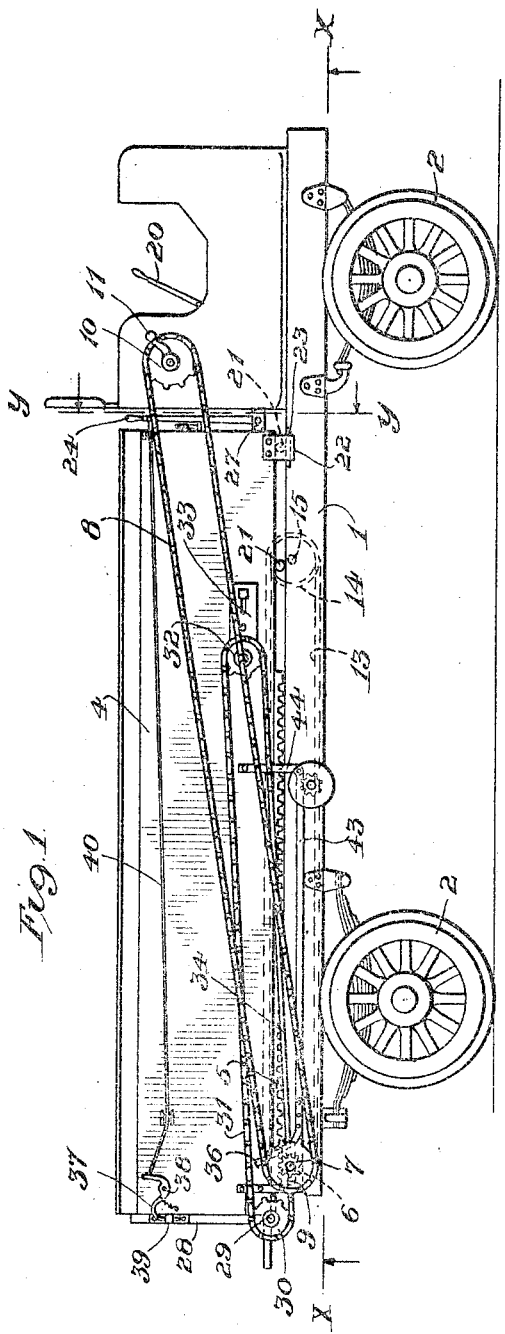
Witnesses:
Henry T. Bull
A. A. Olson
Inventor:
Joseph J. Byron
By Joshua R. H. Horre
His Attorney

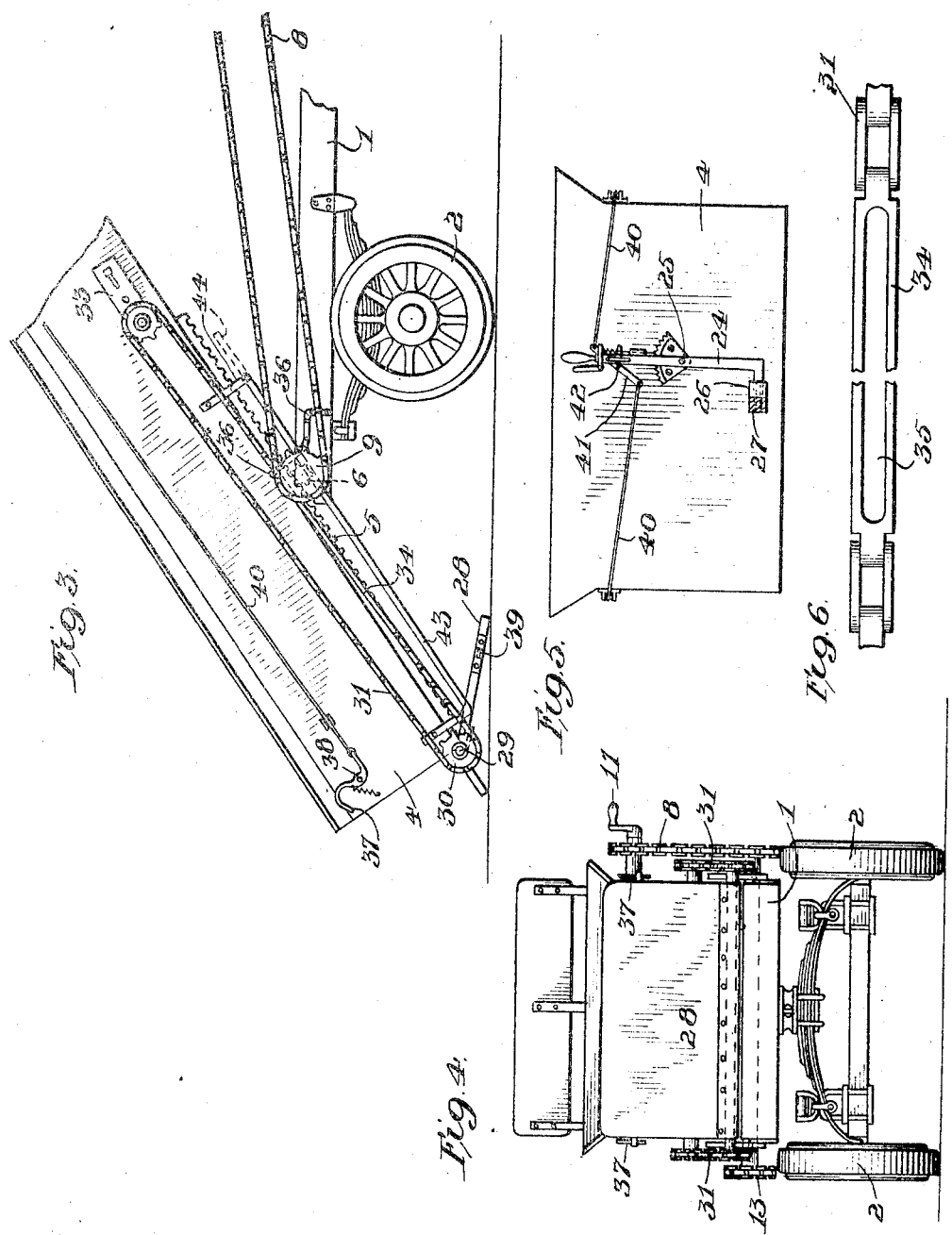

UNITED STATES PATENT OFFICE.

JOSEPH J. BYRON, OF CHICAGO, ILLINOIS.

DUMP-WAGON.

1,087,723. Specification of Letters Patent. Patented Feb. 17, 1914.

Application filed April 9, 1913. Serial No. 759,962.

*To all whom it may concern:*

Be it known that I, JOSEPH J. BYRON, a former subject of the King of Great Britain, who have declared my intention of becoming a citizen of the United States, and a resident of the city of Chicago, county of Cook, and State of Illinois, have invented certain new and useful Improvements in Dump-Wagons, of which the following is a specification.

My invention relates to improvements in dump wagons and has for its object the production of a wagon of this character which will be of durable and economical construction, one in which the dumping of the body of the wagon may be readily and easily effected, and in which the body may be readily and expeditiously returned to operative position after dumping, and further one which will be efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of a dump wagon embodying my invention, Fig. 2 is a horizontal section taken on line *x—x* of Fig. 1, Fig. 3 is a side elevation of the rearward portion of the wagon showing the body thereof in dumping position, Fig. 4 is a front elevation of the wagon, Fig. 5 is a section taken on substantially line *y—y* of Fig. 1, and Fig. 6 is an enlarged fragmentary detail of the sprocket chain employed in the construction to effect swinging of the tail gate of the body of the wagon.

The preferred form of construction as illustrated in the drawings comprises a chassis 1 mounted upon wheels 2, a motor 3 of any approved design being mounted at the forward end of said chassis for effecting driving of the rear wheels of the vehicle in the propulsion of the latter.

The rearward end portion of the chassis 1 is flat and horizontally disposed. Mounted upon said rearward portion of the chassis is the body 4 of the wagon which is mounted for free longitudinal movement and, when said body is moved rearwardly to a sufficient extent, to permit of the tilting of said body to dumping position, as shown in Fig. 3. Longitudinal movement of the body 4, as mentioned, is secured through the medium of racks 5 which are provided upon the under side of said body and which mesh with pinions 6 secured to a shaft 7 which is rotatably mounted in the chassis 1 adjacent the rearward end of the latter. With this arrangement, it will be seen that, upon rotation of said shaft, the body 4 will be moved longitudinally of the chassis, the direction in which said body is moved, that is forwardly or rearwardly, depending of course upon the direction in which said shaft is rotated. Manual rotation of the shaft 7 as mentioned, is effected by means of an endless sprocket chain 8 which passes around a sprocket wheel 9 provided at one end of said shaft 7 and a sprocket wheel 10 which is mounted at the front end of the chassis 1, as clearly shown in the several views. A crank handle 11 is connected with the sprocket wheel 10 for manual rotation thereof and hence of the shaft 7, and so with this arrangement it will be seen that longitudinal movement of the body 4 in order to dump the same or to return the same to operative position after being dumped, may be effected by rotation of handle 11. The latter, as will be observed, is positioned in operative proximity with the driver's seat so that, in use, dumping or returning of the body 4 may be secured without the necessity of the driver leaving his seat. Provided at the opposite end of the shaft 7 is a sprocket wheel 12 around which travels an endless sprocket chain 13 which also passes around a sprocket wheel 14 carried by a counter-shaft 15 mounted in the chassis 1 toward the front end thereof. Splined to the shaft 15 is a bevel gear 16 adapted to mesh with a bevel gear 17 which is fixed to the power shaft 18 of the motor 3, as clearly shown in Fig. 2. With this arrangement it will be seen that, upon movement of the bevel gear 16 into mesh with the gear 17, an operative connection will be established between the motor 3 and the shaft 7 thereby rendering it possible, if desired, to actuate the body 4 by the power of the traction motor of the wagon. The bevel gear 16 is slid upon the shaft 15 into and out of engagement with the gear 17 by means of a suitable switching mechanism or set of levers 19 which are connected for operation with an oscillatory lever or handle 20 positioned in operative proximity with the driver's seat.

In order to alleviate friction in the longitudinal movement of the body 4 upon the chassis 1, rollers 21 are preferably provided at the under side of the front end of said body which are adapted to contact with the upper side of said chassis when said body is operatively positioned thereon, as clearly shown in Fig. 1. At the front end of the body 4, at either side thereof, are provided angular plates 22 the lower end portions of which are inwardly turned in order to engage under outwardly projecting flanges 23 secured to the chassis 1 in order to lock the front end of the body 4 against relative upward movement when said body is positioned at its forward terminal of movement upon the chassis.

The body 4 is releasably locked in position against relative longitudinal movement by means of a lever 24 which is fulcrumed at 25 upon the front end wall of the body 4, as clearly shown in Fig. 5. The lower angularly formed end of the lever 24 is adapted, when the body 4 is properly positioned upon the chassis 1 to engage registering perforations provided in ears 26 and 27 provided respectively upon the front end wall of the body 4 and the adjacent wall of the chassis, said ears being so positioned that, when the body 4 is in operative position, the perforations thereof will be in registration with each other, as clearly shown in Figs. 1 and 5. Unlocking of the body 4 in order to permit of rearward movement thereof is effected by simply oscillating lever 24 to disengage the lower end thereof from said ears 26 and 27 as will be readily understood.

Provided at the rear end of the body 4 is a tail gate 28 the lower edge of which is pivoted or hingedly secured to said body 4 at 29. Fixed to the gate 28 at either side thereof are sprocket wheels 30 which are arranged in alinement with the axis of movement of said tail gate. Traveling around the sprocket wheels 30 are endless sprocket chains 31, said sprocket chains also passing around sprocket wheels 32 which are carried by bearing plates 33 adjustably mounted upon the opposite sides of the body 4, the adjustment afforded the plates 33 providing means for taking up any slack in the chains 31 which may be caused through operation.

Interposed in each of the chains 31 is an elongated link or bar 34 provided with an elongated longitudinally extending slot 35, as clearly shown in Fig. 6. The slots 35 of the links 34 are engaged by the upper ends of fingers 36 which are rigidly secured to the opposite sides of the chassis 1 adjacent the rearward end thereof. The arrangement is such that, upon longitudinal movement of the body 4 as for instance rearwardly, when said body has moved to an extent corresponding with the length of the slots 35 in the links 34, or until the fingers 36 have traversed said slots 35, the under sides of the chains 31 will be retarded by said fingers, and so that upon continued rearward movement of the wagon body the chains 31 will move relative thereto to cause rotation of the sprocket wheels 30 and hence swinging of the tail gate 28 to open position. Upon return movement of the body 4, reverse rotation of the sprocket wheels 30 and hence return swinging of the tail gate 28 will of course be effected when said body 4 has traveled forwardly an extent corresponding with the length of the slots 35 or when the fingers 36 have traversed the length of said slots, as will be readily understood. The slots 35 are elongated as mentioned, in order to delay return or closing swinging of the tail gate 28 until the body 4 has been moved forwardly to such an extent that the front end will be dropped to normal position upon the chassis, such return movement of said end of said body taking place of course when the center of gravity of said body passes the pivotal point thereof or the axis of shaft 7. With this arrangement then it will be seen that upon movement of the body 4 to effect dumping thereof or returning of said body to position after having been dumped, the tail gate 28 will be automatically and simultaneously swung to open and closed positions.

The tail gate 28 is releasably locked in closed position by spring held catches 37 which are pivoted at 38 at opposite sides of the body 4 adjacent the rearward extremity thereof, said catches being adapted to engage loops 39 provided at the lateral edges of the gate, as shown in the several views. Actuation of the catches 37 is effected through the medium of flexible cords or cables 40 which are connected with the forward ends of said catches, said cords or cables passing forwardly over guide rollers and being connected at their forward ends with the respective extremities of a link 41 which is fulcrumed at 42 midway its extremities upon the front end of the body 4, as clearly shown in Fig. 5. The link 41 is in slot-and-pin connection with the lever 24 so that upon rocking of said lever said link will be also rocked in order to draw the cords or cables 40 forwardly and hence rock the catches 37 to inoperative positions. With this arrangement then, it will be seen that, in use, upon rocking of the lever 24 in order to release the body 4 to permit of rearward movement thereof for dumping, the catches 37 will be simultaneously rocked in order to release the tail gate to permit of the same swinging to open position.

Arranged at the opposite sides of the body 4 are angular bars 43 the rearward upwardly turned ends of which are rigidly secured as by screws or bolts to the opposite sides of the body 4 adjacent the rearward end thereof. The forward ends of said rods 43 are secured by means of members 44 to the opposite sides of the body 4, the members 44 being hingedly or pivotally connected with said rods 43 in order to permit the same swinging to the dotted line position, as shown in Fig. 3. The lower portions of the rods 43 extend parallel with the under side of the body 4 spaced slightly therefrom, the same engaging under the shaft 7 in order to serve as a means of locking the body 4 in position or more precisely to hold the racks 5 in mesh with the pinions 6. By hingedly connecting the forward end pieces 44 with the forward extremities of the rods 43, when it is desired to detach the body 4, the upper ends of said members 44 need only to be released from the vehicle body and swung to the dotted line position as shown in Fig. 3 whereupon said body may be moved rearwardly to such an extent as to disengage the same from the shaft 7, as will be readily understood.

In using the dump wagon set forth then, when it is desired to dump the same, it is only required to rock the lever 24 which effects unlocking of the body of the vehicle and also the tail gate of said body, and then to actuate the handle 11 or the lever 20 depending upon which form of power it is desired to utilize in the dumping. Upon rearward movement of the body 4, when the same reaches a position in which the center of gravity thereof passes rearwardly of the shaft 7, the rearward end of said body will drop downwardly causing said body to assume the dumping position shown in Fig. 3, the tail gate 28 in this movement of the body being simultaneously swung to open position. The returning of said body to operative position upon the chassis is effected by simply rotating the handle 11 rearwardly or by reversing the driving of the shaft 18 through the usual clutch provided in the driving mechanism of the vehicle. When the body has reached its forward terminal of movement upon the chassis the same may be locked in position by simply tilting the lever 24, the latter being equipped with the usual pawl and ratchet detent mechanism which engages with the conventional segmental rack for locking said lever in its positions of adjustment. Upon rocking of said lever 24 to operative position the catches 37 will be simultaneously released for movement to locking engagement with the tail gate under the influence of the springs coöperating with said catches.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A dump wagon comprising a chassis; a body movably and tiltably mounted upon said chassis, said body, when moved rearwardly on said chassis to a sufficient extent, being adapted to tilt of itself to dumping position; means for moving said body longitudinally of said chassis; a swingingly mounted tail gate on said body; a sprocket wheel fixed to said gate at its pivot; a sprocket chain passing around said sprocket wheel; and means coöperating with said chain whereby, upon rearward movement of said body, said gate will be swung to open position, and, upon forward movement of said body, said gate will be swung to closed position, substantially as described.

2. A dump wagon comprising a chassis; a body movably and tiltably mounted upon said chassis, said body, when moved rearwardly on said chassis to a sufficient extent, being adapted to tilt of itself to dumping position; means for moving said body longitudinally of said chassis; a swingingly mounted tail gate on said body; a sprocket wheel fixed to said gate at its pivot; a sprocket chain passing around said sprocket wheel; and a stop coöperating with said chain, whereby, upon rearward movement of said body, said gate will be swung to open position, and, upon forward movement of said body, said gate will be swung to closed position, substantially as described.

3. A dump wagon comprising a chassis; a body movably and tiltably mounted upon said chassis, said body, when moved rearwardly on said chassis to a sufficient extent, being adapted to tilt of itself to dumping position; means for moving said body longitudinally of said chassis; a swingingly mounted tail gate on said body; a sprocket wheel fixed to said gate at its pivot; a sprocket chain passing around said sprocket wheel having a link provided with an elongated slot; and a rigid stop finger engaging said slot for retarding movement of said chain relative to said chassis, whereby, upon rearward movement of said body, said gate will be swung to open position, and, upon forward movement of said body, said gate will be swung to closed position, substantially as described.

4. A dump wagon comprising a chassis; a body movably and tiltably mounted on said chassis, said body, when moved rearwardly on said chassis to a sufficient extent, being adapted to tilt of itself to dumping position; means for moving said body longitudinally of said chassis; a swingingly mounted tail gate on said body; a sprocket wheel fixed to said gate at its pivot; a sprocket chain passing around said sprocket wheel; and a stop coöperating with said chain whereby, upon rearward movement of said body, said gate will be swung on its pivot to a position under said body and upon forward movement of the latter, said gate will be returned to closed position, substantially as described.

In testimony whereof I have signed my name to this specification in the presence of two subscribing witnesses.

JOSEPH J. BYRON.

Witnesses:
ARTHUR A. OLSON,
JOSHUA R. H. POTTS.